United States Patent [19]
Thompson, Jr.

[11] 3,833,242
[45] Sept. 3, 1974

[54] BICYCLE FRAME
[75] Inventor: William A. Thompson, Jr., Toms River, N.J.
[73] Assignee: Original Plastic Bike, Inc., New York, N.Y.
[22] Filed: Dec. 29, 1972
[21] Appl. No.: 319,843

[52] U.S. Cl. ............................................. 280/281
[51] Int. Cl....................... B60k 19/02, B60k 19/16
[58] Field of Search................... 280/281, 282, 274; 296/31 P; 46/201–202

[56] References Cited
UNITED STATES PATENTS

| | | | |
|---|---|---|---|
| 620,787 | 3/1899 | MacKenzie | 280/281 |
| 3,233,916 | 2/1966 | Bowden | 280/274 |
| 3,542,391 | 11/1970 | O'Hara | 280/282 X |

*Primary Examiner*—David Schonberg
*Assistant Examiner*—Terrance L. Siemens
*Attorney, Agent, or Firm*—Brumbaugh, Graves, Donohue & Raymond

[57] ABSTRACT

A bicycle frame formed as a unitary plastic molding is, in outline, a forwardly-upwardly sloping parallelogrammatic structure having a diagonal seat post connected between the middle diagonal corners. The top and front struts are formed of a semicylindrical portion and a radial rib portion protruding perpendicularly from the face opposite the semicylindrical face of the semicylindrical portion; the back and bottom braces are formed of a semicylindrical portion and a bar portion extending beyond the flat face of the semicylindrical portion and in the plane thereof. The entire frame is molded in one piece with a hard exterior skin covering a structural foam interior.

15 Claims, 10 Drawing Figures

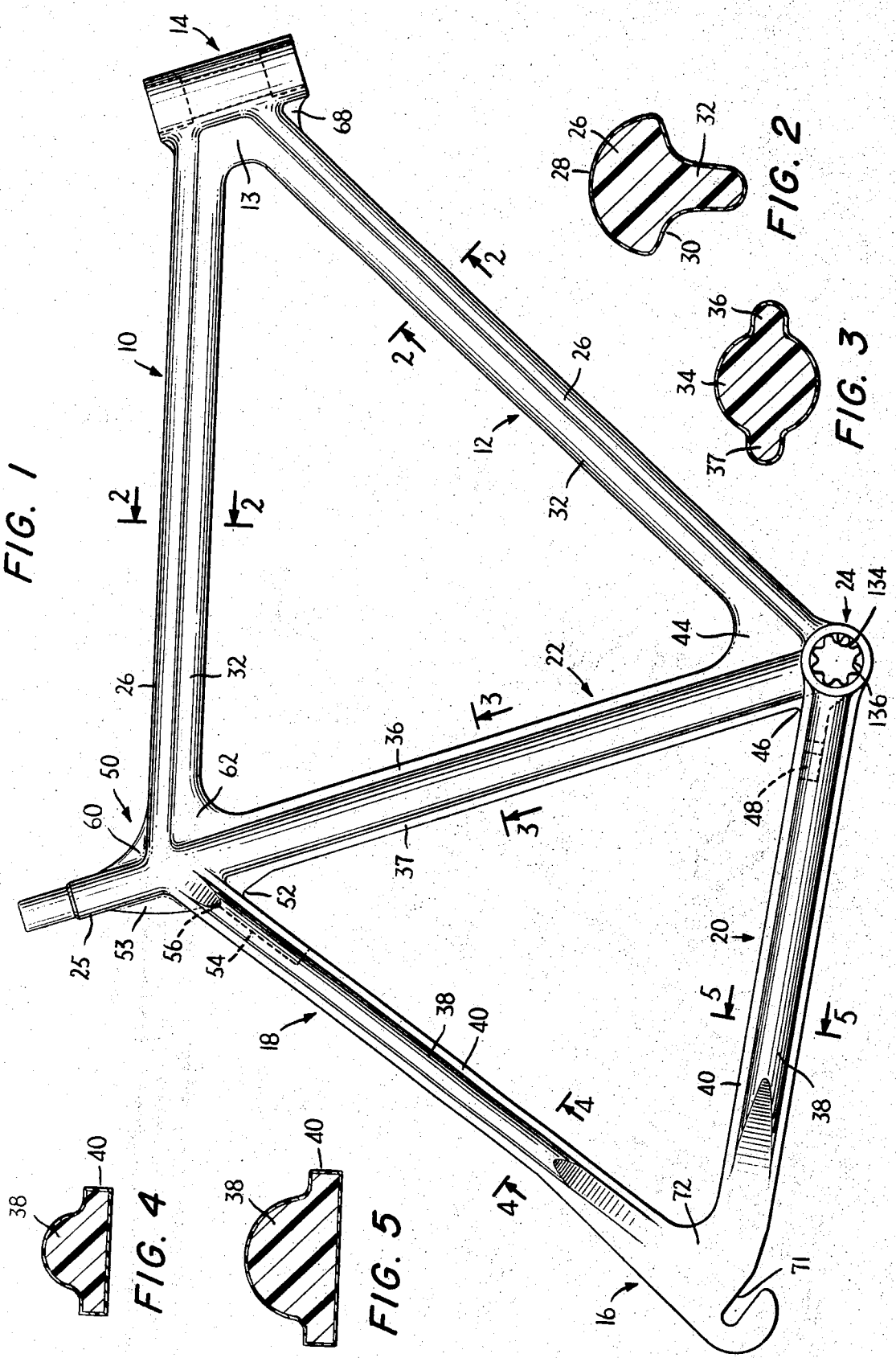

BICYCLE FRAME

BACKGROUND OF THE INVENTION

This invention relates to structural frames and more particularly to bicycle frames.

A recent revival in interest in bicycling has generated a demand for bicycles and bicycle parts, including bicycle frames, which demand has exceeded the supply. Because the existing manufacturing techniques used in manufacturing conventional bicycle frames make it difficult for manufacturers to quickly increase their capacity, the increased demand for bicycle frames remains unsatisfied and has resulted in an increase in cost.

Conventional high quality bicycle frames are formed of a plurality of tubular members and lugged frame joint fittings that must be individually fabricated and then individually assembled to form the complete frame. The latter process includes assembling the lugged frame joint fittings and the tubular members in a jig, spot or arc welding and/or brazing the tubular members in the lugged joints, cleaning and grinding the arc welds to form smooth junctions, priming the assembled frame to prevent rust, and, finally, applying the finishing coats of paint. This process is obviously slow and labor-intensive and the labor/material cost ratio is high. Thus, a frame that could be fabricated faster and with considerably less expenditure of labor, especially one amenable to automated techniques, would be considerably cheaper and would be most welcome in the industry.

The assembly of the frame components in the welding jig must be done with considerable care to assure accurate alignment. If the frame is misaligned, the front wheel will track in a non-vertical plane, with the result that bicycle will tend to veer off to one side. Consequently, the rider must continually compensate to hold the bicycle on course, and such a bicycle is tiring to ride and difficult to handle. A bicycle frame that is intrinsically perfectly aligned would eliminate this troublesome problem and would represent a substantial advancement in the art.

The welded or brazed junctions of conventional tubular frames are the most frequent points of failure in the frame. A brazed or sweated connection of a tubular member in a lugged fitting can separate under stress, resulting in elongation and flattening of the frame. Welded joints can be accurately examined for flaws and impurities only by conventional X-ray or xeroradiography which is expensive and time consuming, so such examination is rarely if ever done. These undetected flaws and impurities in the weld, and even rust on the weld, can cause stress concentrations and fracture growth that substantially weakens the weld to the point where it will fail upon impact, usually while the bicycle is in operation. The development of this failure mode is the more treacherous because it is difficult to detect until, finally, the weld fails and the frame collapses. Clearly, a frame formed without welds and brazes and therefore free of this potential for elongation and unexpected collapse would be a welcome development indeed.

The priming and painting steps for conventional bicycle frames are necessary to prevent rust. Even with such precautions, however, the hard use to which bicycles are ordinarily put frequently results in scratches and scrapes on the painted surface that open bare metal to air and water and result in rust formation that can spread and disfigure and ultimately weaken the frame unless corrective steps are taken. Thus, a bicycle frame formed of an inert material that would be immune to rust would not require the priming and painting steps. The economies achieved by elimination of the priming and painting steps could be passed on to the buyer, and this in combination with the freedom from maintenance necessary for conventional bicycles would make such a bicycle frame competively very attractive.

Conventional metal frames are often quite heavy despite the efforts by manufacturers to reduce the weight of the frame. Weight reduction is chiefly obtained by using thinner tubing and more exotic materials. Expensive racing bicycles, for example, are often fabricated of titanium tubing, which is light and strong but is a difficult material with which to work. The cost of such bicycles is well beyond the means of the majority of potential bicycle buyers, so they must content themselves with frames fabricated of steel, which is considerably heavier. Thus, an inexpensive bicycle frame which could be fabricated of a light and strong material would be greatly welcomed by the industry and the bicycling public.

SUMMARY OF THE INVENTION

Accordingly, this invention provides a perfectly aligned bicycle frame formed without welds of a light and strong material which is immune to rust and is amenable to low-cost, high-volume production.

A bicycle frame according to this invention includes a unitary plastic molding having a hard exterior skin and a structural foam interior, and is formed with structural members having a cross-sectional shape designed to maximize the resistance to the bending moments to which they are subjected in use.

DESCRIPTION OF THE DRAWINGS

These and other objects of the invention will be better understood by consideration of the detailed description of the preferred embodiment when read in conjunction with the appended drawings, in which:

FIG. 1 is an elevation of a bicycle frame according to the present invention;

FIG. 2 is a cross-section along lines 2—2 in FIG. 1;

FIG. 3 is a cross-section along lines 3—3 in FIG. 1;

FIG. 4 is a cross-section along lines 4—4 in FIG. 1;

FIG. 5 is a cross-section along lines 5—5 in FIG. 1;

DESCRIPTION OF THE PREFERRED EMBODIMENTS

Figure 6:
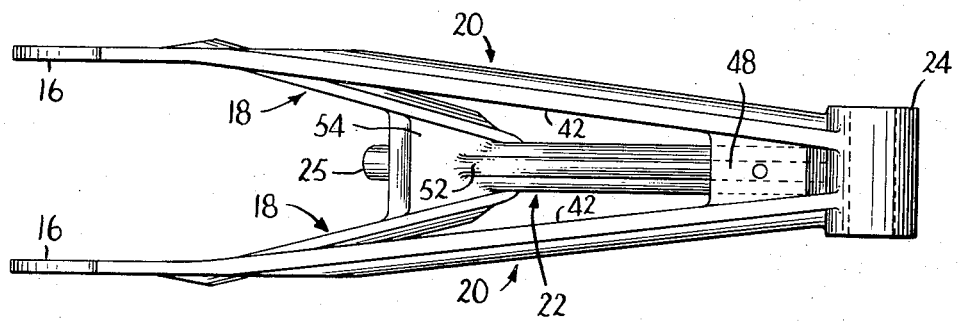
FIG. 6 is an inverted plan of the bicycle frame shown in FIG. 1.

A bicycle frame according to the invention is shown in FIG. 1 having a top strut 10 and a front strut 12, the front end of both struts being joined by a fillet 13 and connected to a headset sleeve 14. The headset sleeve 14 receives and supports a front fork 90, shown in FIGS. 8 and 10, to which the front wheel of the bicycle is attached.

Figure 7:
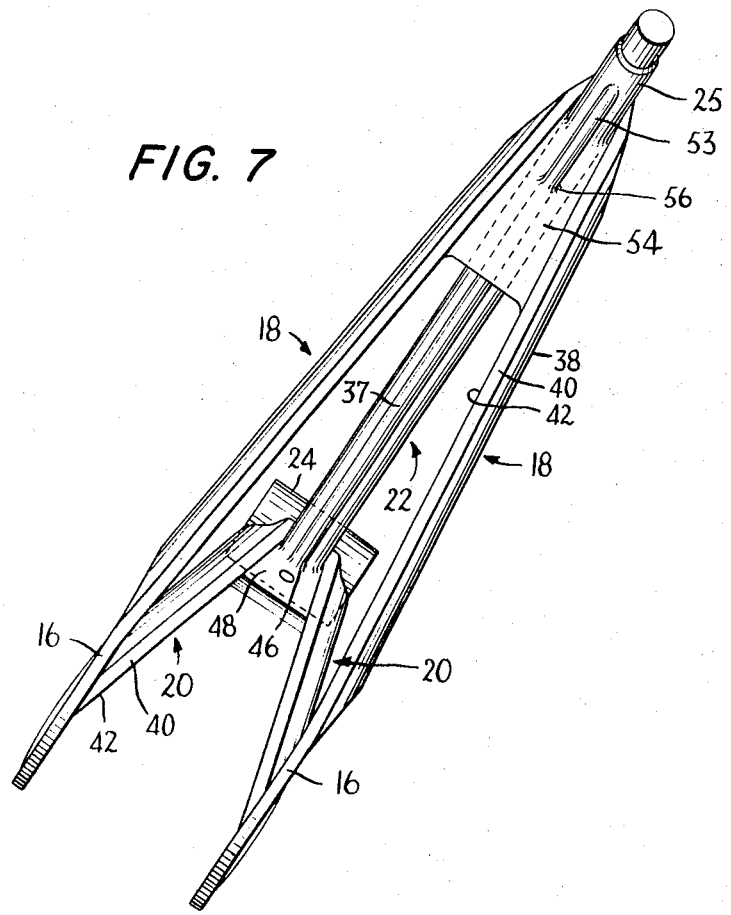
FIG. 7 is an elevation, viewed from the rear of the bicycle frame shown in FIG. 1.

AS FIGS. 1, 6 and 7 show, a pair of rear connectors 16 for attachment of the rear wheel (not shown) is molded as an integral part of the frame and is braced and rigidly supported by a pair of laterally spaced back braces 18 and a pair of laterally spaced bottom braces 20. The connectors 16 and braces 18 and 20 straddle the rear wheel to provide balanced support for the frame on the wheel.

The ends of braces 18 and 20 are connected respectively to the top and bottom of a diagonal seat post 22 and the struts 10 and 12 are also connected to the top and bottom, respectively, of the diagonal seat post 22 adjacent the junction thereof with braces 18 and 20. Thus, the overall outline of the frame is generally a forwardly-upwardly sloping parallelogram with a diagonal seat post 22 connecting the middle corners, that is, the corners formed by the junctions of the top strut 10 with the braces 18, and front strut 12 with the braces 20.

A pedal sleeve 24 is formed at the lower end of the seat post 22 for receiving and supporting a pedal crank axle. The pedal crank axle assembly is more particularly described below in connection with FIG. 9. The top end 25 of the seat post 22 is extended beyond the junction of the strut 10 and the braces 18 to receive a bicycle seat (not shown). This arrangement is superior to the standard prior art arrangement in which a tube is fixed to the bicycle seat and telescopes down into the top end of the seat post. In such an arrangement, it is difficult to gage the length of tube extending into the seat post and riders will occasionally raise the seat too far, unmindful of the weak and dangerous support provided by only a very short length of seat tube extended into the seat post. Without a sufficient length of seat tube extending into the seat post, the seat tube clamp is not strong enough to withstand the shock of the rider's weight when going over a curb, for example, and will collapse, dumping the rider off the bike or onto the jagged broken seat clamp.

By extending the seat post above the top strut 10, and clamping the bicycle seat to the seat post extension 25, the rider is able to see exactly how much of the seat post extension 25 extends above the seat clamp and into the supporting structure of the bicycle seat so that he will not inadvertently adjust his seat to a dangerous condition.

The struts 10 and 12 are generally mushroom shaped in cross-section as illustrated in FIG. 2. The mushroom shaped cross-section includes a semicylindrical portion 26 having a semicylindrical face 28 and an opposite face 30 from which projects a radially extending rib 32. The rib 32 extends from the center of the radius of curvature of the semicylindrical face 28 inwardly into the parallelogrammatic outline of the frame a distance somewhat exceeding the radius of the semicylindrical sectional 28.

The cross-sectional shape of the seat post 22, illustrated in FIG. 3, includes a cylindrical portion 34, on the front face of which is formed a front ridge 36, and on the rear face of which is formed a rear ridge 37.

The cross-sectional shape of the braces 18 and 20, illustrated in FIGS. 4 and 5, is generally that of a derby, having a semicylindrical section 38 and an integrally formed bar section 40 projecting as a secant to the arc that defines the curved contour of the semicylindrical section 38. In other words, braces 18 and 20 are each formed of a bar section 40 from one face of which projects a semicylindrical section 38. As best illustrated in FIGS. 6 and 7, the flat faces 42 of the bar sections 40, opposite the faces from which the semicylindrical sections 38 project, face one another across the rear wheel (not shown), which they straddle.

The design of the bottom braces enables them easily to withstand the tension exerted on them during normal coasting, and also the cyclic compression and twisting forces exerted on them during strenuous pedalling. This design thus overcomes the problem of spongy response and cyclically alternating misalignment that is experienced by riders of prior art bicycles having excessively flexible bottom braces.

The frame is molded as a unitary piece from a tough resilient plastic material such as a glass fiber impregnated polycarbonate resin. The frame is preferably molded using an injection molding technique such as that disclosed in U.S. Pat. Nos. 3,268,636 and 3,456,446 to R. G. Angell, Jr., that produces an exterior hard shell and a structural foam interior, thereby maximizing the moment of inertia per unit mass per unit length of the structural members, and concomitantly maximizing the resistance to bending moments in the directions to which these members are subjected. The cross-sectional shapes of the several members, as described above, are designed to yield optimum resistance to bending about the axes about which these members normally experience bending moments, and to yield, at the same time, an overall impression of a highly pleasing aesthetically balanced symmetrical form.

The junctions of the elongated structural members are smoothly blended and filleted to provide maximum strength and aesthetic smoothness. At the pedal sleeve 24, where the diagonal seat post 22, the front strut 12 and the bottom braces 20 are joined, the front ridge 36 is smoothly blended onto the radial rib 32 to form a curved fillet 44. The rear ridge of the diagonal seat post 22 is curved rearwardly to form a fillet 46 blending smoothly with a bottom web 48 that spans the forward ends of the bottom braces 20 and forms a support for attachment of a kick stand (not shown). The outer ends of the bars 40 of the bottom braces 20 are curved out slightly at their junction with the pedal sleeve 24 to form a strong and aesthetically pleasing junction therewith. The smooth flowing lines of these joints eliminate sharp corners that would otherwise provide points of stress concentration and produce a failure mode caused by further concentration of stress at the resulting cracks.

To maximize the strength of the junction of the diagonal seat post 22 with the front strut 12 and the bottom braces 20 at the pedal sleeve 24, the skin of the frame in this area is preferably formed thicker than the skin of the elongated structural members. Thus, in one embodiment of a frame according to this invention, the skin of the elongated structural members is 0.080 inch thick while the skin of the pedal sleeve junction is 0.095 inch thick. Likewise, the other junction points in the frame such as the fork sleeve 14, the seat post area, and the rear connectors 16 for the rear wheel are preferably formed with increased skin thickness since these areas experience the maximum stress. The weight that would be saved by providing these junctions with thinner skin does not warrant the lesser structural strength of the joints that would result from using the thinner skin.

The rear ridge 37 of the seat post is enlarged near the seat post junction 50 and curved rearward to form a fillet 52 that blends smoothly with the undersurface of a top web 54 which lends lateral support to the forward ends of the back braces 18. Above the top web 54, the rear ridge 37 is enlarged at 53, is curved rearwardly and blends smoothly with the top web 54 to form a fillet 56. The enlargement 53 of the rear ridge 37 and its connection with the top web 54 strengthens the top extension 25 of the seat post 22, enabling it better to resist the rearward bending moments exerted by the weight of the rider seated on the bike seat (not shown) mounted on the seat post extension 25.

A fillet 60 is formed between the front face of the seat post extension 25 and the top of the top strut 10 for purposes of better appearance, greater strength, and elimination of stress concentration. The radial rib 32 of the top strut 10 is enlarged and curved downward to blend smoothly with the forward ridge 36 of the seat post 22 to form a fillet 62 at the junction therebetween. The semicylindrical portion 26 of the top strut 10 curves around the seat post 22 at the junction therewith and blends smoothly with the bar sections 40 of the back braces 18 to provide a smooth flowing aesthetically pleasing appearance while maximizing the strength and stress resistance of the joint.

At their junction with the headset sleeve 14, the cylindrical portions 26 of the top strut 10 and the front strut 12 are enlarged and smoothly merge into the headset sleeve 14, forming fillets 68 for the same purposes as the other fillets formed at the junctions of the frame members. The fillet 13 formed at the junction of the radial ribs 32 of the top strut 10 and the front strut 12 has already been mentioned, and is for the same beneficial purpose as fillets 44 and 62.

The junction of the back braces 18 and the bottom braces 20 at the rear connector 16 is formed by blending the semicylindrical portion 38 of the back and bottom braces smoothly into the bars 40 and simultaneously widening the lateral dimensions at the bars 40. The hook into which the rear wheel is secured is formed by providing a slot 71 in the rear connector 16 to receive the shaft of a rear wheel hub, such as that disclosed in my copending application Ser. No. 258,055, filed May 30, 1972, for "Bicycle Hub". A fillet 72 is formed by an enlargement and junction of the bars 40 to provide a structure of great strength well designed to resist the stress at this junction.

Figure 8:
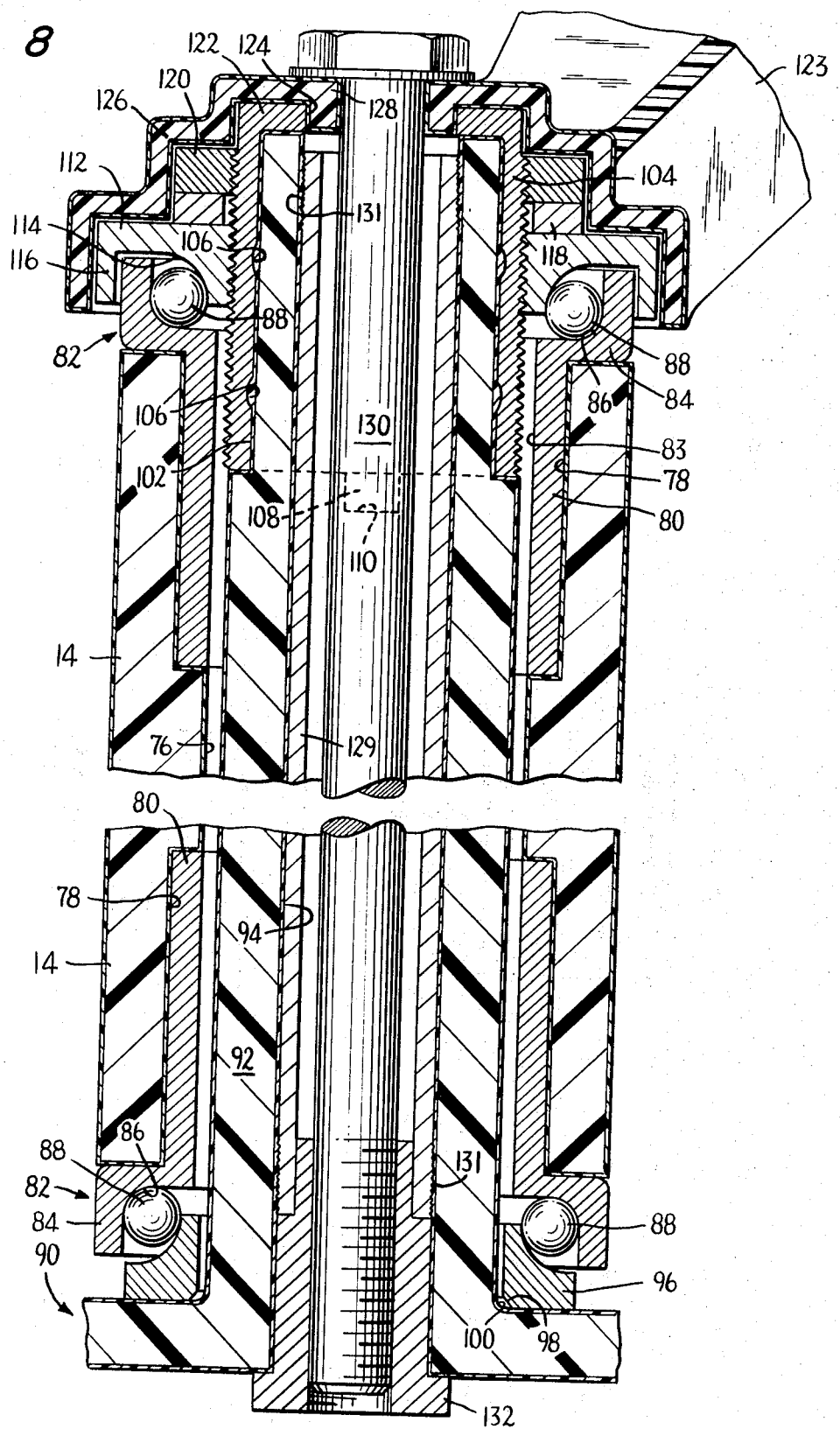
FIG. 8 is a cross-section of the assembled headset.

The headset assembly shown in FIG. 8 includes the headset sleeve 14 having a central bore 76 both ends of which are counter bored at 78. Each counter bore 78 receives the main cylindrical portion 80 of a bearing sleeve 82. The internal diameter 83 of the main cylindrical portion 80 of the bearing sleeve 82 is substantially identical to the internal diameter of the bore 76 of the headset sleeve 14. The extreme end of each bearing sleeve 82 is enlarged in internal and external diameters to produce an offset cylindrical portion 84 and provide an interior shoulder 86 which functions as a cupped bearing race. A set of ball bearings 88 is disposed in the bearing race 86, preferably in a bearing cage of conventional design (not shown).

Figure 10:
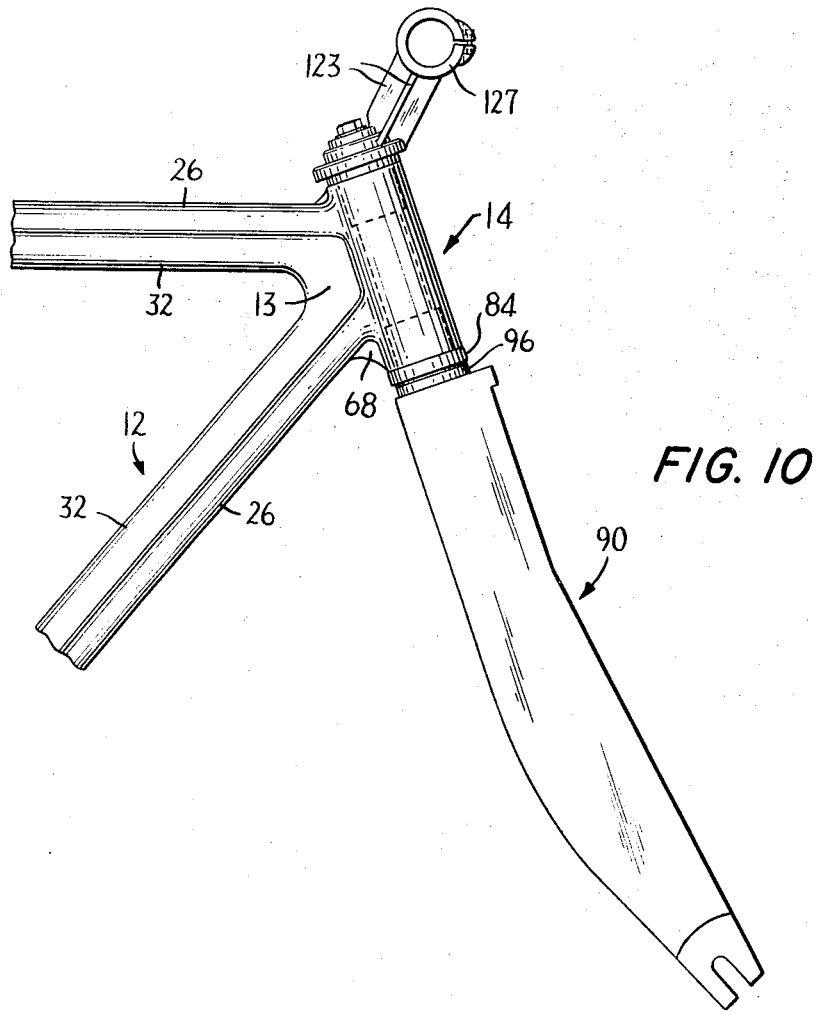
FIG. 10 is an elevation of the front fork assembly.

A front fork 90 shown in FIGS. 8 and 10 receives the front wheel (not shown). A vertical fork sleeve 92 extends upwardly from the front fork 90 and extends through the central bore 76 of the headset sleeve 14 and the bore 83 of the bearing sleeve 82, and an axial bore 94 is formed completely through the fork sleeve 92. A bottom bearing race ring 96 is disposed at the junction of the front fork 90 and the fork sleeve 92. The corner of the lower inside periphery of the bottom race 96 is chamferred at 98 to preclude cutting into a fillet 100 at the junction of the front fork 90 and the fork sleeve 92.

The outside diameter of the top portion of the fork sleeve 92 is stepped radially inward to form a reduced outside diameter portion 102. An exteriorly threaded cylindrical ferrule 104 fits snuggly over the reduced diameter portion 102 of the fork sleeve 92. A pair of cannelures 106 are formed on the inside cylindrical surface of the ferrule 104 into which the material on the fork sleeve 92 flows when the ferrule 104 is ultrasonically welded to the top of the fork sleeve, thereby securely locking them together. A pair of keys 108 is formed on the bottom edge of the ferrule 104 and are received in a complementary pair of notches 110 formed on the shoulder of the fork sleeve 92 at the junction of the large diameter portion and the reduced diameter portion 102, whereby the torque exerted on the ferrule 104 will be transmitted to the fork sleeve 92.

An interiorly threaded top race ring 112 formed with a downwardly facing cupped bearing race 114 is threadedly engaged with the ferrule 104 and screwed down to snugly engage the cupped bearing race 114 with the bearings 88. An outside depending flange 116 overlies and surrounds the offset cylindrical portion 84 of the bearing sleeve 82. A longitudinal slot (not shown) is cut the full length of the exterior surface of the ferrule 104 to receive a key (not shown) formed on the interior periphery of a washer 118 disposed around the ferrule 104 and lying against the top surface of the top race ring 112. A lock nut 120 is screwed onto the ferrule 104 and tightened against the washer 118 to maintain the correct spacing between the bearing races 86 and 114.

A top flange 122 is formed on the top of the ferrule 104 and has formed therethrough a square hole 124. A cap 126 having a handlebar clamp 127 connected thereto by a set of crossed ribs 123, best shown in FIG. 10, covers the top of the ferrule 104, the lock knot 120 and the top race 112, and formed centrally on the underside of the cap 126 is a square lug 128 that fits snugly within the square hole 124 in the top of the ferrule 104. By this arrangement, torque applied to the handlebar by the rider is transmitted through the handlebar clamp and the attached cap 126 to the ferrule 104 by way of the square lug 128 engaged in the square hole 124 in the ferrule flange 122. The ferrule 104 is securely locked to the fork sleeve 92, so that rotation of the ferrule 104 also rotates the fork sleeve 92 and the attached front fork 90 to turn the front wheel and steer the bicycle.

A tube 129 is disposed axially within the fork sleeve 92 and is knurled on both ends 131 to provide a surface which may be ultrasonically welded to the inside walls of the axial bore 94 of the fork sleeve 92. The tube 129 provides additional rigidity to the headset 14 to prevent rearward flexing of the handlebars during strenuous pedalling.

A bolt 130 extends through a hole in the top of the cap 126 and extends completely through the tube 129 to be threadedly engaged with an exteriorly threaded flanged bushing 132 which fits into the lower end of the bore 94. The bolt 130 is torqued down to bear the full stress exerted on the headset tending to separate the fork sleeve 92 from the headset sleeve 14.

This arrangement is admirably suited to withstand the high impact stresses to which the headset of the bicycle is subjected. The cupped bearing races distribute the stress borne by the bearings over a large area and thereby reduce the stress on the bearing races and prevent dimpling or indentations of the races by the ball bearings. The threaded bearing race 114 and the lock nut 120 permit the bearing races to be adjusted and held at the optimum spacing and the bolt 130 permits the headset to be secured under high compression. This arrangement provides an extremely crisp turning action of the front fork in the headset. While the front fork is supported rigidly in the headset sleeve 14, the handlebar will turn freely without a trace of roughness or binding.

This steering head together with the intrinsically perfectly aligned frame enables the bicycle to provide optimum stability, that is, the gyroscopically induced resistance to change of direction, and at the same time, provide a fully satisfying sense of maneuverability and control. The perfect frame alignment eliminates the annoying and distracting tendency of the bicycle to veer off course so there is no need for continual steering compensation; the tight, low friction support of the fork in the headset introduces no front fork friction or extraneous effects such as lost motion, lateral shifting, cocking or wobbling of the handlebar which would drown out or prevent transmission to the rider of part of the feedback through the handlebar of the gyroscopic stabilizing forces of the rotating front wheel, the "feel of the road", or a precise feel of the exact orientation of the front wheel. The rider is thus able to remain sensitive to the more subtle spectrum of feedback effects through the handlebar that would otherwise be masked by a loose, rough, or binding headset; his sense of balance and control of the bicycle is enhanced and bicycle riding becomes more enjoyable.

Figure 9:
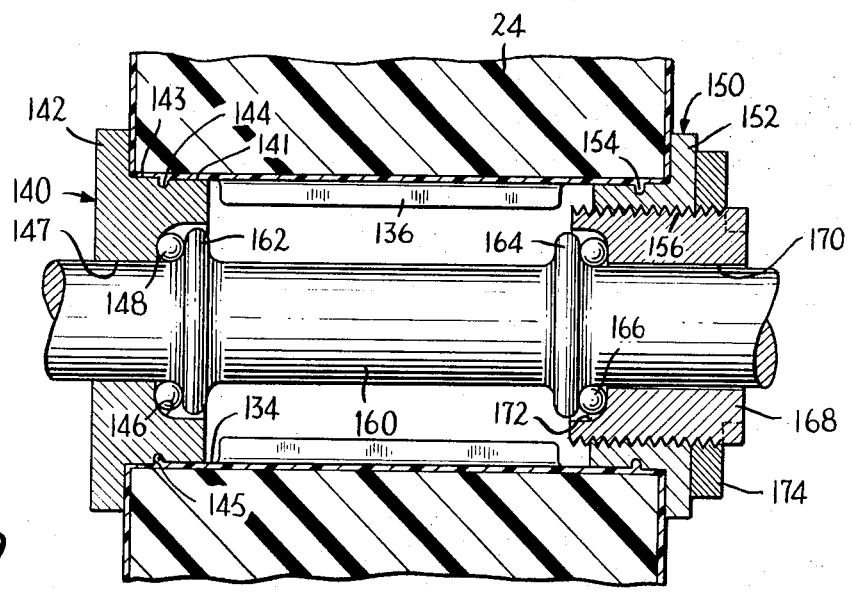
FIG. 9 is a cross-section of the pedal crank axle assembly.

The pedal sleeve 24 receives and supports a pedal crank axle assembly, as shown in detail in FIG. 9. The pedal sleeve 24 is formed with a central lateral bore 134 in the central portion of which are formed a series of longitudinal corrugations 136. Since the exterior skin is the material having the greater strength, the interior bore of the pedal sleeve 24 is corrugated to increase the amount of skin material around the pedal sleeve and thereby increase its strength. In addition, a corrugated cylinder is stronger than a plain cylindrical cylinder of the same diameter.

A bearing cup 140 is fixed in one end of the bore 134 through the pedal sleeve 24. A first cylindrical portion 141 on the inside end of the bearing cup 140 has an outside diameter the same as the inside diameter of the bore 134. On the other end of the bearing cup 140 is an enlarged flange 142, and intermediate the ends of the bearing cup 140 is an intermediate cylindrical portion 143 slightly larger in outside diameter than the inside diameter of the bore 134.

A small groove or cannelure 144 is formed around the exterior periphery of the bearing cup 140 between the first cylindrical portion 141 and the intermediate cylindrical portion 143. The bearing cup 140 is mounted on the horn of an ultrasonic welding head and guided concentrically into the bore 134 of the pedal sleeve 24. The forward shoulder 145 of the intermediate cylindrical portion 143 gathers the ultrasonically softened plastic material from the inside cylindrical surface of the bore 134 and directs it down into the cannelure 144. When the flange 142 abuts the outside face of the pedal sleeve 24, the welder is turned off and withdrawn and the plastic rehardens in the cannelure 144 to anchor the bearing cup 140 in place.

A bore 147 is formed centrally through the bearing cup 140 and at the interior peripheral corner of the bore 147 a bearing race 146 is formed and receives and engages a set of ball bearings 148.

On the opposite side of the pedal sleeve 24 from the bearing cup 140, a bearing housing 150 is inserted into the bore 134. The bearing housing 150 has formed on the outside end thereof an enlarged diameter flange 152 which abuts the outside face of the pedal sleeve 24 when the bearing housing 150 is fully inserted into the bore 134. At the other end from the flange 152 the bearing housing 150 fits snuggly within the bore 134, and then expands in diameter adjacent a cannelure 154 formed on the bearing housing 150 for the same purpose as the cannelure 144 on the bearing cup 140. A threaded bore 156 is formed axially through the bearing housing 150.

A pedal crank axle 160 having a pair of annular bearing ridges 162 and 164 spaced axially along the pedal crank axle 160 is inserted through the threaded bore 156 of the bearing housing 150 and into the bore 147 of the bearing cup 140 until the bearing ridge 162 engages the bearings 148.

A set of bearings 166 held in a bearing cage (not shown) is fitted over the pedal crank axle 160 and slid into engagement with the bearing ridge 164. An exteriorly threaded bearing nipple 168 having an axial bore 170 formed therethrough and a cupped bearing race 172 formed on the interior peripheral corner of the bearing nipple 168 is threaded into the bearing housing 150 and is turned snugly against the bearings 166. A lock nut 174 is then threaded onto the bearing nipple and is tightened against the flange 152 of the bearing housing 150 to lock the bearing nipple 168 securely in its adjusted position. The pedal crank axle 160 is now securely locked in axial position and supported by bearings 148 and 166 for free rotation about its axis. It now remains merely to attach the pedal cranks with their pedals (not shown) to the pedal crank axle 160.

The material of which the preferred embodiment of this frame is molded is a glass fiber impregnated polycarbonate resin such as "Lexan 900" or "Lexan 500" manufactured by General Electric Company. A bicycle frame made of this material does not break or separate when subjected to a stress sufficient to break or separate a bicycle frame made of metal tubing, but rather bends and then resiliently returns to its original form.

The integral molding of this frame eliminates one of the most serious weaknesses of prior bicycle frames, namely, the need to weld or braze the constituent members at their junctions. These welds and brazes are never perfect and often have minute cracks and voids that constitute origin points for fracture growth that eventually causes complete failure of the joint. By eliminating the need for welds and brazes altogether, the present invention eliminates these inherent defects in the prior-art fabrication process and thereby avoids the problems that they cause.

The unitary frame provided by this invention is completely free of the corners and sharp joints that, in prior bicycle frames, constitute points of stress concentration. In addition, the plastic will not rust or corrode and may be molded with any desired color, thereby eliminating the need for painting and other protective coatings heretofore required to protect the frame from rust, and thus the inventive frame will last many years without need of the special care required by prior bicycle frames.

Plastic frames molded according to this invention are considerably lighter than ordinary prior-art metal tubing frames and are in the weight category of competition-type racing bicycles, which are priced beyond the means of most purchasers. The frames molded according to this invention are less expensive than most economical prior metal-tube-type bicycle frames, and thus a purchaser of a bicycle frame according to this invention spends less than he would for most existing prior-art bicycles while obtaining a bicycle comparable in weight and superior in strength and durability to competition racing bicycles.

Numerous modifications and variations of the above preferred embodiment are possible in view of this disclosure, and the invention may be embodied in other forms without departing from the spirit and scope of the appended claims.

I claim:

1. A bicycle frame, comprising a generally parallelogrammatic unitary plastic molding, including:
    a top strut and a front strut, said top strut being integral at one end thereof with one end of said front strut;
    a headset sleeve integral with the junction of said top and front struts for holding a front fork;
    a pair of laterally spaced back braces;
    a pair of laterally spaced bottom braces;
    one end of one of said back braces being integral with one end of one of said bottom braces;
    one end of the other of said back braces being integral with one end of the other of said bottom braces;
    the other ends of said back braces being integral with each other and to the other end of said top strut;
    the other ends of said bottom braces being integral with each other and with the other end of said front strut;
    a diagonal post integral at one end thereof with the junction of said top strut and said back braces and at the other end thereof with the junction of said bottom braces and said front strut; and
    a pedal sleeve integral with said last mentioned junction for receiving a pedal crank axle.

2. A bicycle frame as defined in claim 1, further comprising:
    a top web integral with and extending between said back braces at the junction thereof with said diagonal post; and
    a bottom web integral with and extending between said bottom braces at the junction thereof with said pedal sleeve.

3. A bicycle frame as defined in claim 2, further comprising:
    a longitudinal ridge formed on the forward face and the rearward face of said post;
    said rearward facing ridge being enlarged at an upper portion thereof and integral with said top web.

4. A bicycle frame as defined in claim 1, wherein said pedal sleeve further comprises a series of internal longitudinal corrugations around the interior of the pedal sleeve.

5. A bicycle frame as defined in claim 1, further comprising:
    a bearing cup anchored in one end of said pedal sleeve, said bearing cup having a cupped bearing race and also having means formed in said bearing cup defining an axial bore therethrough;
    a bearing housing anchored in the other end of said pedal sleeve and having means formed therein defining an interiorly threaded axial bore therethrough; and
    a bearing nipple having an exteriorly threaded surface engaged with said bearing housing and a cupped bearing faced formed on said bearing nipple.

6. A bicycle frame as defined in claim 1, further comprising a headset, including:
    a top and a bottom bearing sleeve concentrically mounted in said headset sleeve, each bearing sleeve having a bearing race formed thereon;
    a front fork having an axially bored fork sleeve integral therewith and extending concentrically through said headset sleeve and said top and bottom bearing sleeves;
    a ferrule anchored on the end of said fork sleeve and having screw threads formed on the exterior surface of said ferrule;
    a bearing ring threadedly engaged with said ferrule and having a bearing race facing the bearing race of said top bearing sleeve bearing race and holding therebetween a set of ball bearings;
    a cap covering said ferrule and in torque transmitting engagement therewith a handlebar clamp connected to said cap; and
    a bolt extending through said cap and said fork sleeve and engaged with a threaded bushing at the bottom end of said fork sleeve bore to hold said headset together.

7. A bicycle frame comprising:
    a top strut and a front strut, said top strut being connected at one end thereof to one end of said front strut;
    back brace means and bottom brace means, said back brace means being connected at one end thereof to one end of said bottom brace means;
    the other end of said top strut being connected to the other end of said back brace means;
    the other end of said front strut being connected to the other end of said bottom brace means;
    said top strut and said front strut each having a semicylindrical portion having a semicylindrical face, and a radial rib portion projecting radially from the side opposite said semicylindrical face a distance at least equal to the radius thereof.

8. A bicycle frame as defined in claim 7, further comprising:
a diagonal post connected at one end thereof to the junction of said top strut and said back brace means and at the other end thereof to the junction of said bottom brace means and said front strut; and
a ridge formed on the forward face and the rearward face of said post;
said forward-facing ridge being enlarged at the top and bottom of said post and forming a top front fillet and a bottom front fillet, respectively, with said top strut radial rib and said front strut radial rib.

9. A bicycle frame as defined in claim 8, wherein:
a pedal sleeve is formed on said diagonal post adjacent the lower end thereof;
said back brace means includes a pair of laterally spaced back braces connected at one end of each to said diagonal post adjacent the top thereof, and said bottom brace means includes a pair of laterally spaced bottom braces connected at one end of each to said pedal sleeve;
a top web is connected between said back braces adjacent the connection thereof to said diagonal post;
a bottom web is connected between said bottom braces adjacent the connection thereof to said pedal sleeve; and
said rearward-facing ridge of said diagonal post is enlarged at the top and bottom of said diagonal post and forms a top rear fillet and a bottom rear fillet, respectively, with said top web and said bottom web.

10. A bicycle frame as defined in claim 7, wherein:
said back brace means includes a pair of laterally spaced back braces connected together at one end thereof;
said bottom brace means includes a pair of laterally spaced bottom braces connected together at one end thereof;
the other end of one of said back braces is connected to the other end of one of said bottom braces;
the other end of the other of said back braces is connected to the other end of the other of said bottom braces;
a diagonal post is connected near one end thereof to the junction of said top strut and said back braces, and at the other end thereof is connected to the junction of said bottom braces and said front strut; and
said bottom braces each have a bar portion and a semicylindrical portion projecting from one face of said bar portion, the opposite face of each of said bar portions facing one another.

11. A bicycle frame as defined in claim 10, wherein:
said back braces each have a bar portion and a semicylindrical portion projecting from one face of said bar portion, the opposite face of each of said bar portions facing each other.

12. A bicycle frame, comprising:
a unitary plastic molding including a connector for attachment of a rear wheel, a pedal sleeve for receiving a pedal crank axle, a seat post extension for receiving a seat, a fork sleeve for receiving a front fork, and frame means for rigidly interconnecting said connector, said pedal sleeve, said seat post, and said fork sleeve;
said frame means of said unitary plastic molding formed of a hard exterior skin and a structural foam interior.

13. A bicycle frame as defined in claim 12, wherein said frame means comprises:
a top strut connected between said seat post extension and said fork sleeve;
a front strut connected between said fork sleeve and said pedal sleeve;
said top strut and said front strut having a semicylindrical portion and a radial rib portion formed on the side opposite the semicylindrical face of said semicylindrical portion and projecting radially therefrom.

14. A bicycle frame as defined in claim 12, wherein said frame means comprises:
back brace means connected between said seat post extension and said rear connector;
bottom brace means connected between said pedal sleeve and said bar connector;
a seat post connected between said seat post extension and said pedal sleeve,
said back and bottom brace means including a pair of laterally spaced back braces and a pair of laterally spaced bottom braces;
each of said back braces and said bottom braces having a bar portion and projecting from one face thereof, a semicylindrical portion.

15. A bicycle frame as defined in claim 12, wherein said frame means comprises:
a seat post connected between said seat post extension and said pedal sleeve,
a top strut connected between said seat post and said fork sleeve;
a front strut connected between said fork sleeve and said pedal sleeve;
said top strut and said front strut having a semicylindrical portion and a radial rib portion formed on the side opposite the semicylindrical face of said semicylindrical portion and projecting radially therefrom a distance at least equal to the radius thereof;
back brace means connected between said seat post and said rear connector;
bottom brace means connected between said pedal sleeve and said rear connector;
said back and bottom brace means including a pair of laterally spaced back braces and a pair of laterally spaced bottom braces;
each of said back braces and said bottom braces having a bar portion and projecting from one face thereof, a semicylindrical portion.

* * * * *